Figure 1:
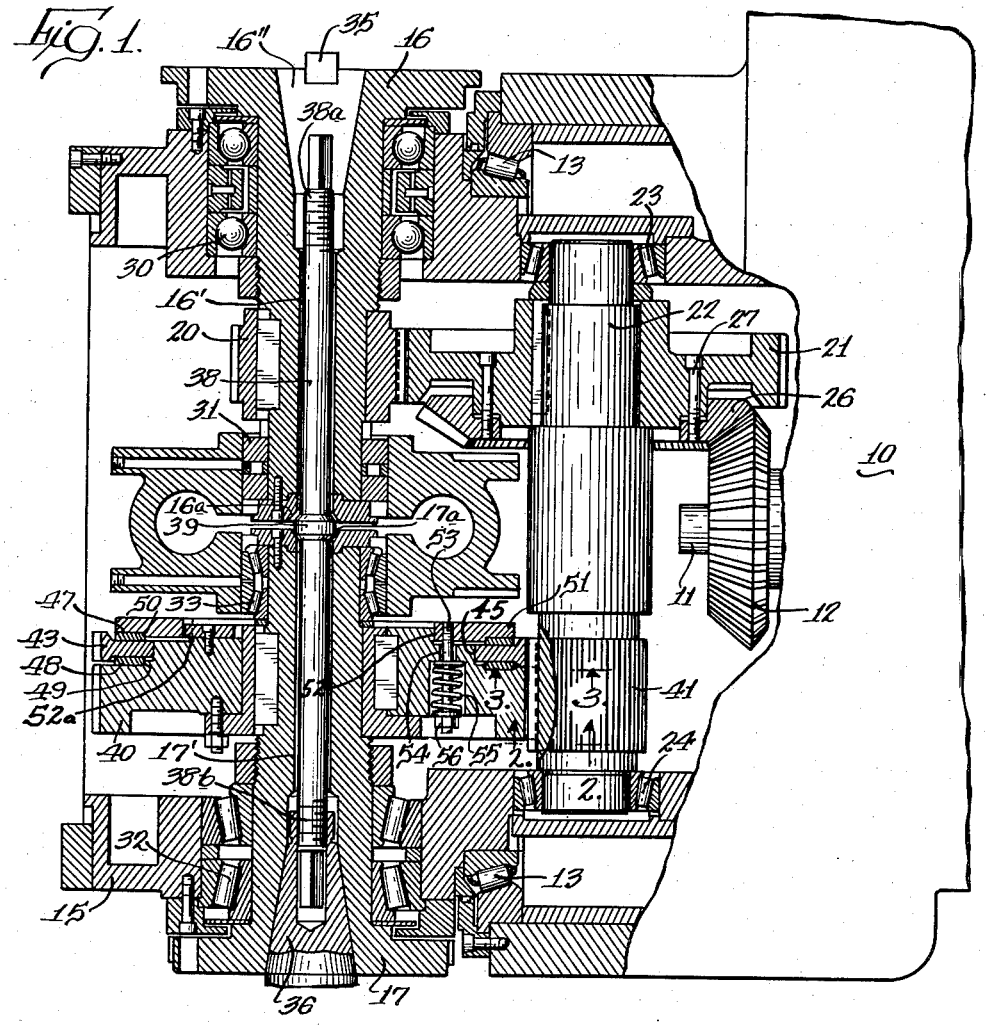

INVENTORS.
Fred R. Swanson
Carl F. Erikson
By Hofgren, Brady,
Wegner, Allen & Stellman
Attys.

Jan. 24, 1961   F. R. SWANSON ET AL   2,968,965
DRIVE WITH ANTI-BACKLASH MEANS
Filed June 24, 1959   2 Sheets-Sheet 2
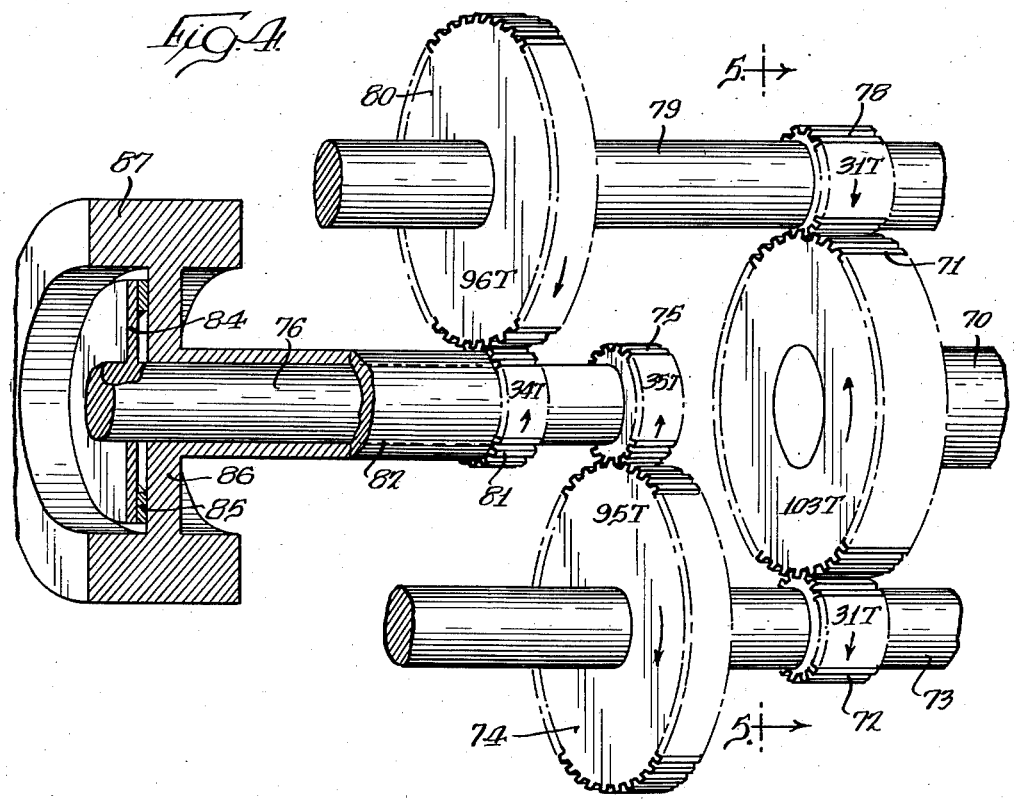
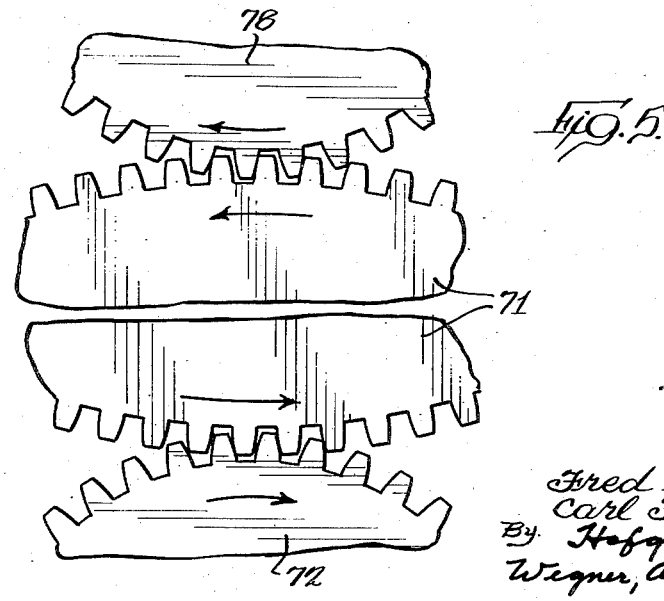
INVENTORS.
Fred R. Swanson
Carl F. Erikson
By Hofgren, Brady,
Wegner, Allen & Stellman
Attys.

United States Patent Office 2,968,965
Patented Jan. 24, 1961

2,968,965

DRIVE WITH ANTI-BACKLASH MEANS

Fred R. Swanson and Carl F. Erikson, Rockford, Ill., assignors to Sundstrand Corporation, a corporation of Illinois Filed June 24, 1959, Ser. No. 822,562

15 Claims. (Cl. 74—409)

This invention relates to drive transmission mechanisms, particularly gear drives, for rotary spindles such as rotary tool supporting spindles in milling machines or other machine tools and the like, and is directed to the provision of anti-backlash means in such drives.

It is a general object of the invention to provide a new and improved drive mechanism of the type described including backlash eliminator means.

In the machine tool art, particularly that relating to milling machines which utilize a milling cutter on a rotary tool supporting spindle, backlash in the gearing driving the spindle, that is, play or lost motion between the meshing gear teeth, is an undesirable condition which gives rise to several problems. For example, assume an extreme case of an arbor-mounted milling cutter of relatively great mass and slow speed and of a construction such that only one or a few cutter teeth engage the work at any one time. In installations of this type the cutter and its supporting spindle or arbor are subjected to an intermittent load as the cutter teeth intermittently engage and then leave the work, and the spindle or arbor will deflect torsionally under load during the cut so that the cutter is lagging behind the drive gearing. When the load is reduced as the cutter leaves the work, the cutter and the spindle or arbor will "unwind" rapidly thereby causing the cutter to rotate faster than the drive gears. When the inertia of the cutter assembly is relatively large with respect to the spindle in the vicinity of the drive gears, the cutter will continue to overspeed the spindle after the "unwinding" is completed until the gears prevent further overtravel, the amount of overtravel being limited by the play or lost motion inevitably present in the gearing.

The conditions described result in very noisy operation, premature wear of the gears, shortened cutter life, and poor finishes on the work, and this is especially true when machining modern metals with tensile strength in the vicinity of 300,000 p.s.i. and heat treated to a hardness in the vicinity of 60 Rockwell C.

In the past, a frequently used effort to solve the problems enumerated above has included the use of a rather large mass in the gear which is mounted on the spindle to thereby provide a large inertia relative to the weight of the cutter. In other cases separate flywheels have been added to the spindle or arbor. In many cases, the flywheels and/or gears become very large and impose undue restrictions on the design possibilities.

The present invention has for an object the provision of an anti-backlash means in a spindle drive mechanism which eliminates the undesirable effects of backlash and also avoids the disadvantages of previous anti-backlash mechanisms. While specific examples have been given in the machine tool art, it will be appreciated that the invention applies equally to any drive or machine requiring constant force or speed against an intermittent load.

With the above in mind, it is a more specific object of the invention to provide in a spindle drive transmission, a new and improved backlash eliminator means which utilizes a braking or holdback gear acting on the spindle mounted gear to prevent advance of the spindle mounted gear relative to its driving pinion, and includes a frictional drag means retarding motion of the spindle mounted gear or the holdback gear.

Another object is to provide a mechanism of the type described in the preceding paragraph including a frictional drag means having at least two relatively rotatable members, one frictionally holding back the other, and wherein the difference in the speeds of the two members is rather slight, within the range of about 1–4% of the speed of either, in order to prolong the life of the friction members and dissipate a minimum amount of horsepower.

A further object is to provide a mechanism of the type described wherein the holdback or braking gear is carried on the spindle mounted gear, also meshes with the driving pinion, has approximately one more tooth than the spindle mounted gear and frictionally retards the latter.

It is also an object of the invention to provide an anti-backlash mechanism including a flywheel of relatively light mass driven by speed increase gearing from the spindle mounted gear so that the effective mass of the flywheel is greater than its actual inertia.

Figure 3:
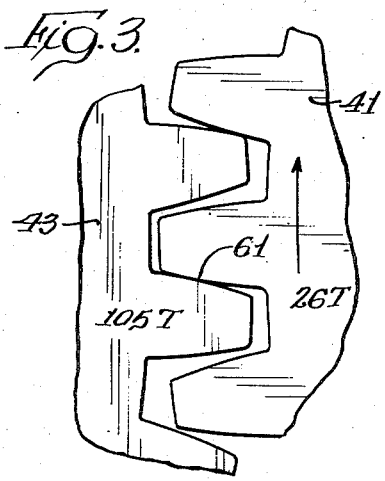
Figure 2:
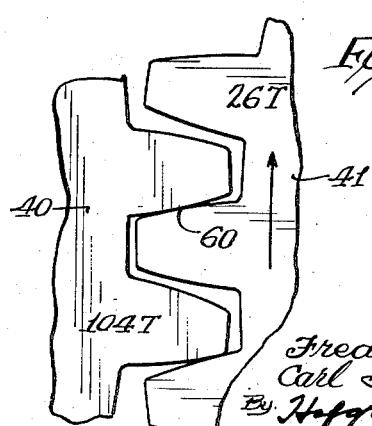

Other objects and advantages will become readily apparent from the following detailed description taken in connection with the accompanying drawings, in which:

Fig. 1 is a fragmentary view of a milling head, mostly in section, illustrating a preferred embodiment of a spindle drive mechanism including the principles of the present invention;

Figs. 2 and 3 are enlarged fragmentary views taken respectively on the lines 2—2 and 3—3 of Fig. 1, illustrating the manner in which the driving pinion teeth are trapped by the teeth of the spindle mounted gear and the braking gear to eliminate backlash;

Fig. 4 is a fragmentary diagrammatic illustration of another spindle drive mechanism embodying the principles of the present invention and including a flywheel in the anti-backlash means; and Fig. 5 is an enlarged fragmentary view taken at about the line 5—5 of Fig. 4 illustrating the manner in which the spindle mounted gear teeth are trapped between the driving pinion and the braking gear to eliminate backlash.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

Referring now to the drawings in more detail, and firstly to the embodiment of Figs. 1, 2 and 3, Fig. 1 includes a fragmentary showing of a milling head of the type disclosed in greater detail in our co-pending application Serial No. 715,109, filed February 13, 1958.

As seen in Fig. 1, the head includes a housing 10 adapted to support a spindle drive motor (not visible) and having a drive shaft 11 with a bevel gear 12 thereon rotatable therewith. The housing 10 is provided with bearings as at 13 which rotatably support an indexable spindle housing 15 which may be turned about the axis of the drive shaft 11 by means not shown and held in adjusted positions by means not visible. The spindle housing 15 includes a pair of spindles as at 16 and 17 on a common axis transverse to the axis of the drive shaft 11. The spindles 16 and 17 are rotatable at different speeds, and the indexable mounting of the housing 15 enables positioning of a selected spindle to a work position. The spindle 16 carries a drive gear 20 rotatable therewith and meshing with a larger driving pinion 21 on an intermediate shaft 22 parallel the spindle axis and rotatably mounted in the housing 15 as by bearings as at 23 and 24. The gear 21 carries a ring-shaped bevel gear 26 secured thereto as by bolts or screws as at 27 and meshing with the bevel gear 12 on the drive shaft 11. In this manner, the spindle 16 is rotated whenever the drive shaft 11 is rotated.

The spindle 16 is rotatably supported by bearings as at 30 and 31, while the spindle 17 is supported by bearings as at 32 and 33. Both spindles have an axial opening therethrough as at 16' and 17', and each opening is formed at the outer spindle end to receive the shank of a milling cutter or the like. For this purpose, the enlarged tool receiving opening as at 16'' is formed with a drive key as at 35 for register with a mating recess in a tool shank such as that illustrated at 36 in the spindle 17. A common draw bar 38 extends through the spindles, and this includes a centrally located annular enlargement 39 which is bevelled at opposite sides and adapted to seat in frusto-conical recesses as at 16a and 17a, depending on which spindle is being used. Opposite ends of the draw bar are threaded as at 38a and 38b for connection to the internally threaded socket in a tool shank such as that at 36.

As will be understood on reference to Fig. 1, the spindle 16 is driven at a relatively higher speed than the spindle 17, the latter being driven by means of a drive gear 40 rotatable therewith and meshing with a smaller driving pinion 41 on the intermediate shaft 22.

In order to prevent backlash in the drive mechanism for the low speed spindle 17, that is, in order to prevent the spindle drive gear 40 from jumping ahead of its driving pinion 41 within the limits allowed by the play or lost motion between the intermeshing gear teeth, a braking or holdback gear 43 is provided. The gear 43 is in the form of a ring rotatable on an annular shoulder 45 formed on the gear 40. Thus, the gear 43 can rotate with the gear 40 and it may also rotate relative to the gear 40. A pair of flat rings 47 and 48 of suitable friction material are positioned on opposite sides of the gear 43, the ring 48 on a shoulder 49 on the gear 40 and the ring 47 on a shoulder 50 formed on a clamping ring 51 carried by the gear 40. Clamp ring 51 is positioned on annular shoulder 52 on gear 60 and has a notch in its inner peripheral surface for receiving a key 52a on gear 40 which locates the ring properly and prevents its rotation relative to gear 40. The clamping ring has a series of studs threaded therein such as the one seen at 53 in Fig. 1, and these studs pass through openings in the gear 40 as at 54. The free ends of the studs carry coiled compression springs as at 55 bearing between a nut 56 on the stud end and a seat in the gear 40. It will be understood that this construction causes rotation of the gear 43 with the gear 40 when the latter is driven by its driving pinion 41.

In order to exert a braking or holdback effect on the drive gear 40, the gear 43 is provided with a greater number of teeth than the gear 40. As a result, because both gears mesh with the driving pinion 41 the gear 40 will complete a revolution while the gear 43 moves only through a portion of one revolution. In a typical construction, the driving pinion 41 has 26 teeth, the spindle drive gear 40 has 104 teeth, and the holdback gear 43 has 105 teeth.

Referring to Figs. 2 and 3, the operation will be readily understood. Fig. 2 shows the action of the driving pinion 41 with its teeth engaging the back faces of the teeth on the spindle mounted gear 40 as at 60 to thereby cause rotation of the gear 40 and the spindle 17. Because the holdback gear 43 has a greater number of teeth, the driving pinion 41 serves to back up the holdback gear relative to the gear 40 by engagement of the back faces of the pinion gear teeth with the front faces of the braking gear teeth as at 61. In this manner, it will be understood that the teeth on the gear 40 and the teeth on the gear 43 trap the teeth on the driving pinion 41, and because the gears 40 and 43 are frictionally held together the latter gear prevents the former advancing relative to the pinion.

It will be understood that the described arrangement effectively eliminates backlash without requiring great masses which limit design possibilities. It will also be appreciated that the difference in speed between the gears 40 and 43 is less than 1% of the speed of the spindle mounted gear 40 so that braking is effectively provided and at the same time the life of the friction elements is substantially prolonged and a minimum amount of horsepower is dissipated, as compared to an arrangement where one or more friction elements are stationary and one or more rotate at high speed.

Referring now to the embodiment of Figs. 4 and 5, a spindle 70 has a drive gear 71 mounted thereon and rotatable therewith. The gear 71 is driven by a driving pinion 72 on an intermediate shaft 73 also having a larger gear 74 thereon in turn meshing with a small gear 75. The gear 75 is fixed on a rotatable input shaft 76 adapted to be driven by any suitable power mechanism.

It will be appreciated that the gearing described comprises a speed reduction means for reducing the speed of the spindle 70 to a value substantially less than that of the input shaft 76 in terms of r.p.m.

In order to prevent backlash between the gears 71 and 72, that is, in order to prevent advance of the gear 71 relative to the gear 72 when the load is intermittently relieved on the spindle 70, an anti-backlash mechanism includes a holdback or braking gear 78 on a shaft 79 which also has a larger gear 80 fixed thereon. The gear 80 meshes with the smaller gear 81 on a tubular shaft 82 concentric on the input shaft 76. It will be understood that this gearing constitutes a speed increase mechanism for rotating the shaft 82 at a speed substantially greater than the speed of the spindle 70.

The frictional drag means in this embodiment comprises a disc or the like as at 84 suitably fixed on the input shaft 76 and engaging a suitable ring of friction material as at 85 which also engages a disc 86 fixed for rotation with the tubular shaft 82. Preferably, the disc 86 is an integral part of a flywheel means provided by a mass 87 carried at the outer perimeter of the disc.

In operation, the gear ratios are such that the disc 84 is driven at a predetermined speed in terms of r.p.m., and the disc 86 is driven at a predetermined greater speed, so that the disc 84 and the friction ring 85 exert a braking effect of the disc 86 which acts through the gears 81 and 80 to hold back the gear 78. This retards advance of the gear 71 relative to the gear 72.

The operation is illustrated in Fig. 5 where it will be seen that the forward, driving faces of the teeth on gear 72 engage the rear surfaces of the teeth on the spindle mounted gear 71. At the same time, the forward surfaces on the teeth of gear 71 engage the rear surfaces of the teeth of holdback gear 78. In this manner the teeth on the gear 71 are trapped between the teeth on gears 72 and 78 to thereby prevent backlash.

In a typical installation, the gears 71, 72, 74 75, 78, 80 and 81 might have the number of teeth designated in Fig. 4 though this is by no means intended as a limitation but merely as an example. For instance, 35 teeth on the gear 75 mesh with 95 teeth on the gear 74, and 31 teeth on the gear 72 mesh with 103 teeth on the gear 71. The 103 teeth on the gear 71 mesh with 31 teeth on the gear 78, and 96 teeth on the gear 80 mesh with 34 teeth on the gear 81. The speed reduction in the gears 72 and 71 cancels the speed increase in the gears 71 and 78, and a comparison of the ratios of gear 75 to gear 74 and gear 80 to gear 81 indicates that the speed of the disc 86 is only about 4% greater than the speed of the disc 84. By virtue of this relationship, the life of the friction elements is greatly prolonged and a minimum amount of horsepower is dissipated as compared to an arrangement where one or more friction elements is stationary while one or more of the others rotates at a high speed.

The ratios of the gear 71 to gear 78 and gear 80 to gear 81 cause rotation of the flywheel 87 at slightly more than 9 times the speed of the spindle 70 in terms of r.p.m. so that the effective inertia of the flywheel as a backlash eliminator is greater than its actual weight if mounted directly on the spindle 70, this being due to the increased speed. Thus, the increased speed enables the use of a flywheel of less size. As the effective inertia increases as the square of the speed ratio, in the specific embodiment described the effective inertia is about 88 times greater than the actual inertia.

We claim:

1. A spindle drive transmission with anti-backlash means, comprising, a rotary spindle having a spindle drive gear thereon rotatable therewith, a power input including a rotary driving pinion meshing with said spindle drive gear for driving the latter to rotate the spindle, a backlash eliminator rotor positively connected with the spindle and rotatable proportionately therewith, a braking member rotated by said power input at a speed less than the speed of the rotor, and friction means connecting the braking member and the rotor to exert a braking effect on the rotor to thereby retard advance of said drive gear relative to said driving pinion.

2. The combination defined in claim 1, wherein the difference between the speed of the backlash eliminator rotor and the speed of the braking member does not exceed four percent of the speed of the braking member.

3. The combination defined in claim 1, wherein the difference between the speed of the backlash eliminator rotor and the speed of the braking member is less than one percent of the speed of the rotor.

4. The combination defined in claim 1, wherein the backlash eliminator rotor is secured to the spindle drive gear and rotatable therewith at the same speed as the drive gear, and said braking member is driven at a speed less than the speed of the drive gear and rotor.

5. The combination defined in claim 1, wherein the backlash eliminator rotor is driven by said spindle drive gear at a greater speed than the drive gear, and said braking member is driven by the power input at a speed greater than the speed of the spindle drive gear but less than the speed of the rotor.

6. A spindle drive transmission with anti-backlash means, comprising, a rotary tool spindle having a spindle drive gear thereon rotatable therewith, a rotary drive shaft having a driving pinion thereon meshing with the drive gear for driving the latter to rotate the spindle, a braking gear frictionally driven by the spindle drive gear, meshing with the driving pinion and having a greater number of teeth than the spindle drive gear so that the driving pinion rotates the braking gear reversely relative to the spindle drive gear and the braking gear thereby frictionally retards rotation of the spindle drive gear and prevents advance of the latter relative to the driving pinion.

7. The combination defined in claim 6, wherein the braking gear has approximately only one more tooth than the drive gear.

8. The combination defined in claim 6, wherein the spindle drive gear has an axially extending annular shoulder, said braking gear comprises an annulus rotatable on said shoulder, and including friction means intervening the drive gear and braking gear whereby the braking gear is driven by the drive gear and exerts a retarding effect on the drive gear.

9. The combination defined in claim 8, wherein the friction means comprises a pair of friction rings, one between the drive gear and the braking gear and the other on the opposite side of the braking gear, a clamping ring outwardly of said other friction ring, and spring means yieldably biasing the clamping ring toward the drive gear to crowd the clamping ring, friction rings and braking gear toward the drive gear.

10. A spindle drive transmission with anti-backlash means, comprising, a rotary tool spindle having a drive gear thereon rotatable therewith, an input including a rotary driving pinion meshing with the drive gear for driving the latter to rotate the spindle, a braking member rotated by said input, a driven gear meshing with said drive gear, a backlash eliminator rotor driven by said driven gear at a speed exceeding the speed of the braking member, and friction means intervening the braking member and the rotor whereby the former exerts a retarding action on the latter and prevents advance of said drive gear relative to said driving pinion.

11. A spindle drive transmission with anti-basklash means, comprising, a rotary tool spindle having a drive gear thereon rotatable therewith, a speed reduction input gearing including an input shaft and a driving pinion meshing with the drive gear for driving the latter to rotate the spindle at a reduced speed relative to the input shaft, a braking member on the input shaft, a backlash eliminator rotor rotatable adjacent the braking member, speed increase gearing including a driven gear meshing with the drive gear for driving the rotor at a speed greater than the speed of the braking member so that the latter retards the former and prevents advance of said drive gear relative to said driving pinion.

12. The combination defined in claim 11, wherein the speed of the rotor is approximately only four percent greater than the speed of the braking member.

13. The combination defined in claim 11, wherein said rotor comprises a flywheel.

14. The combination defined in claim 13, wherein said speed increase gearing causes rotation of the flywheel at approximately nine times the speed of the spindle so that the flywheel has an effective inertia greater than its actual inertia.

15. A spindle drive transmission with anti-backlash means, comprising, a rotary tool spindle having a drive gear thereon rotatable therewith, a speed reduction input gearing including a driving pinion meshing with the drive gear for driving the latter to rotate the spindle at a reduced speed relative to the input gearing, a flywheel rotatably mounted separately from said spindle, and speed increase gearing including a driven gear meshing with the drive gear for driving the flywheel at a speed greater than the speed of the spindle so that the flywheel has an effective inertia greater than its actual inertia for retarding advance of said drive gear relative to said driving pinion.

References Cited in the file of this patent

UNITED STATES PATENTS

| | | |
|---|---|---|
| 2,537,083 | Peoples | Jan. 9, 1951 |
| 2,655,050 | Divette et al. | Oct. 13, 1953 |

OTHER REFERENCES

Publication: Product Engineering, vol. 28, No. 21, Nov. 25, 1957, page 119.